March 8, 1966     H. D. ADAMS     3,239,242
HITCH
Filed Oct. 3, 1962     4 Sheets-Sheet 3
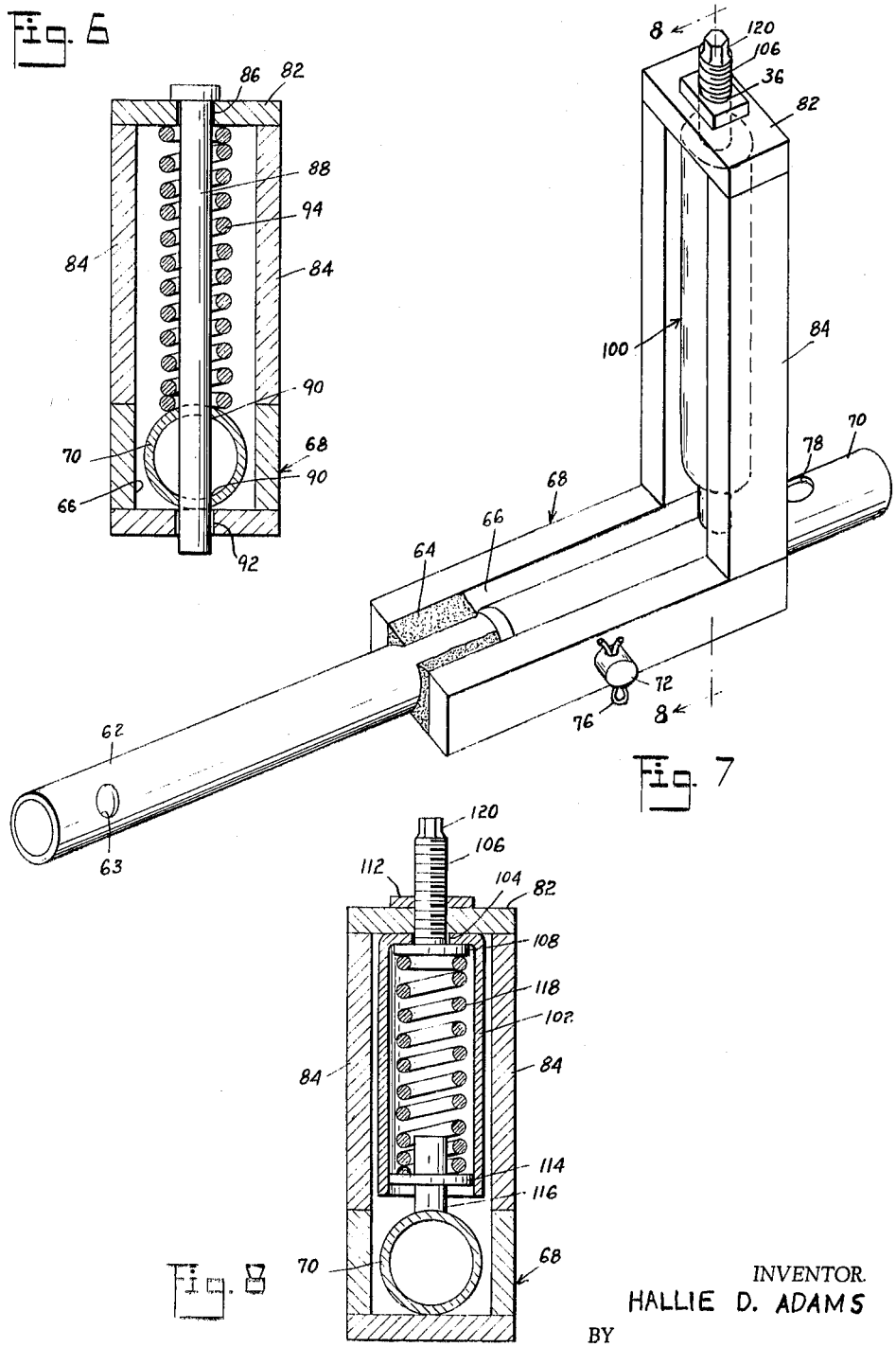
INVENTOR.
HALLIE D. ADAMS
BY
Teare, Fetzer & Teare
ATTORNEYS March 8, 1966 H. D. ADAMS 3,239,242
HITCH Filed Oct. 3, 1962 4 Sheets-Sheet 4

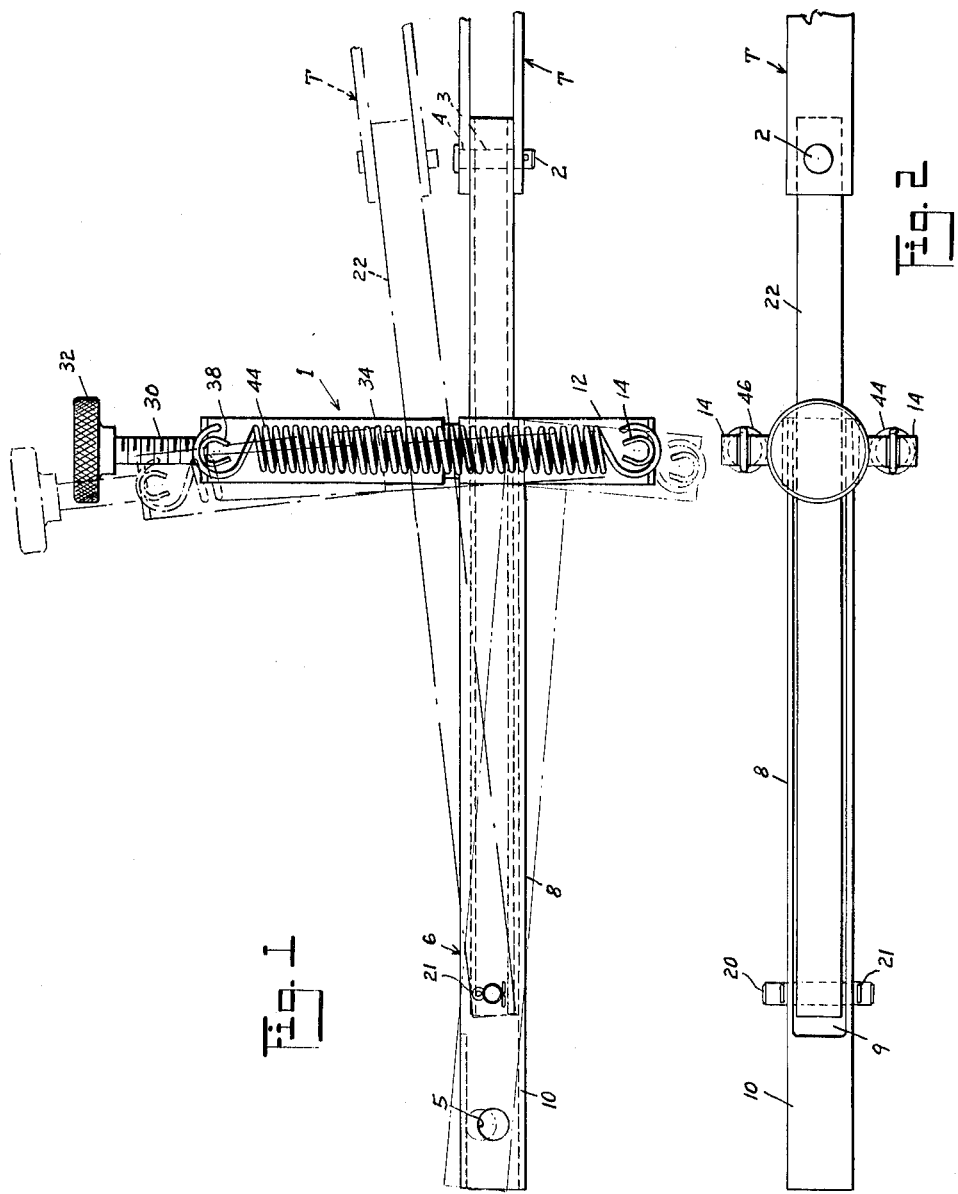

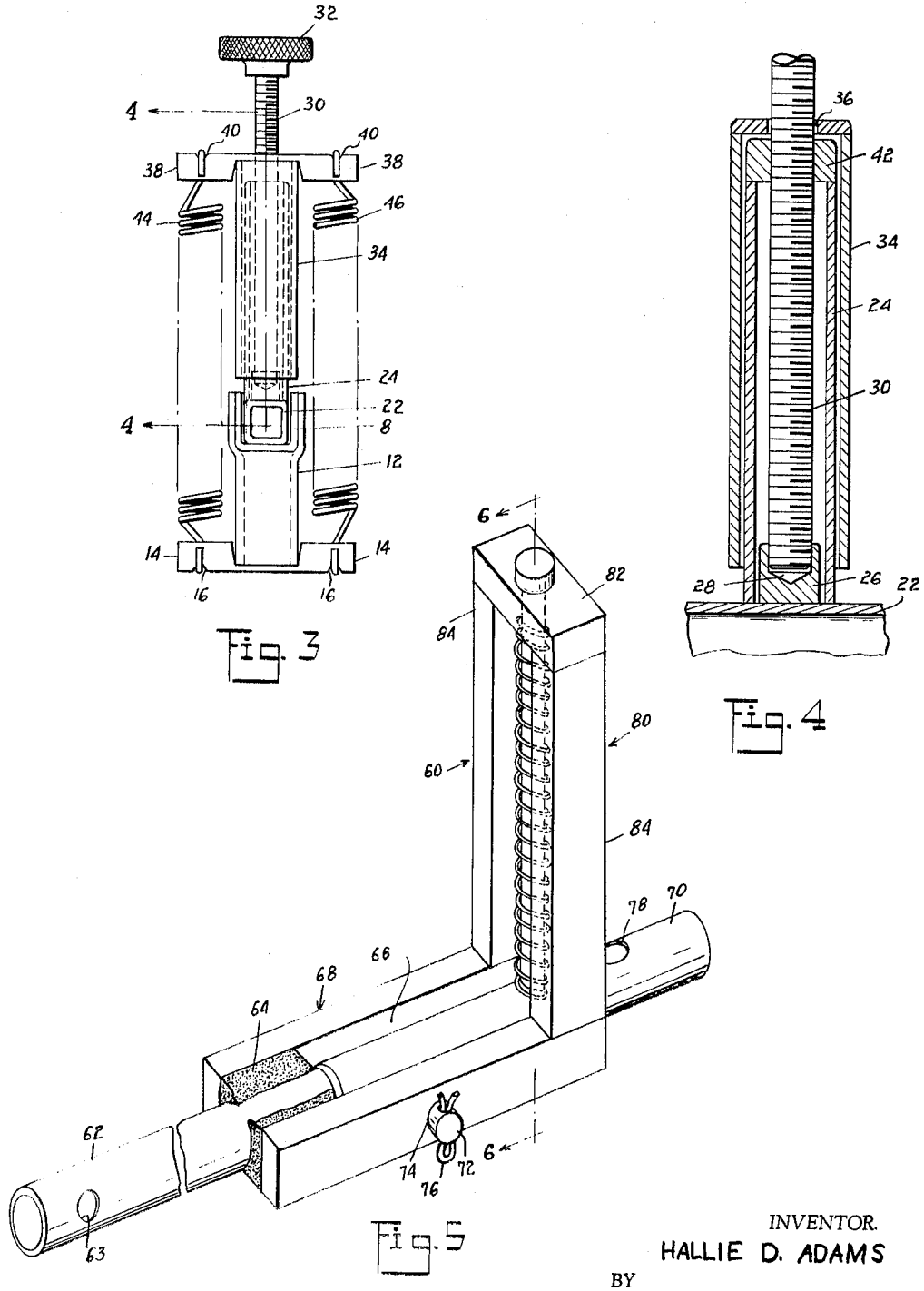

INVENTOR.
HALLIE D. ADAMS
BY
Teare, Fetzer & Teare
ATTORNEYS

United States Patent Office 3,239,242
Patented Mar. 8, 1966

3,239,242
HITCH
Hallie D. Adams, R.F.D. 1, New Lyme, Ohio
Filed Oct. 3, 1962, Ser. No. 229,266
7 Claims. (Cl. 280—489)

The present invention relates to hitches for tractors or the like and more particularly to hitches constructed and arranged for coupling any number of farm implements to a propelling vehicle, such as a tractor.

Heretofore, various coupling mechanisms have been utilized for attaching farm implements to a vehicle, such as a tractor. However, these prior arrangements have not been found to be entirely satisfactory not only because of the relatively high cost of such devices but more importantly because of the unreliability of such devices in actual operation. For example, it frequently occurs that the tractor and towed implement are at relatively different levels in normal operating condition due to the irregularities in the contour of the ground. In such cases, the angularly disparity between the tractor and the towed implement causes the implement to be uncontrollably lifted into and out of working engagement with the ground, thereby resulting in a nonuniform and unpredictable working or cultivating of the ground. In addition, prior arrangements have failed to satisfactorily compensate for the implement striking large or even small undiscovered objects that may protrude from or be buried in the ground thereby imparting severe strains and consequent damage to the coupling.

Accordingly, a primary object of the present invention is to provide a compact, efficient, and durable hitch assembly for readily interconnecting a vehicle to a towed implement.

Another object of the present invention is to provide a novel hitch assembly including yieldable means associated therewith to compensate for any angularity resulting between a vehicle and a towed implement in normal operation.

Another object of the present invention is to provide a pivotal hitch assembly including a yieldable means for interconnecting a vehicle to a towed implement whereby the implement's striking hidden or unforeseen objects will not cause damage to the assembly or implement.

A still further object of the present invention is to provide a novel hitch assembly for yieldably interconnecting a vehicle and a towed implement including adjustable means coacting therewith, whereby it becomes possible to predetermine the yieldable movement of the hitch assembly thereby to automatically maintain the towed implement in working engagement with the ground.

Another object of the present invention is to provide a novel hitch assembly for quickly interconnecting a conventional propelling tractor and any number of farm implements without requiring the use of complex or expensive tools.

An additional object of the present invention is to provide a novel hitch assembly which is simple in construction and economical to produce and operate.

Other objects and advantages of the present invention will be apparent from the following description taken in conjunction with the accompanying drawings wherein:

FIG. 1 is a side elevational view showing the novel hitch assembly of the present invention attached at one end to the tongue of a standard tractor (not shown);

FIG. 2 is a top plan view of the novel hitch assembly shown in FIG. 1;

FIG. 3 is a front elevational view of the novel hitch assembly of FIG. 1;

FIG. 4 is a vertical cross sectional view taken along 4—4 of FIG. 3;

FIG. 5 is a perspective view on a reduced scale showing a modification of the novel hitch assembly of the present invention;

FIG. 6 is a vertical cross sectional view taken along 6—6 of FIG. 5;

FIG. 7 is a perspective view on a reduced scale showing another modification of the novel hitch assembly of the present invention;

FIG. 8 is a vertical cross sectional view taken along 8—8 of FIG. 7;

Figure 9:
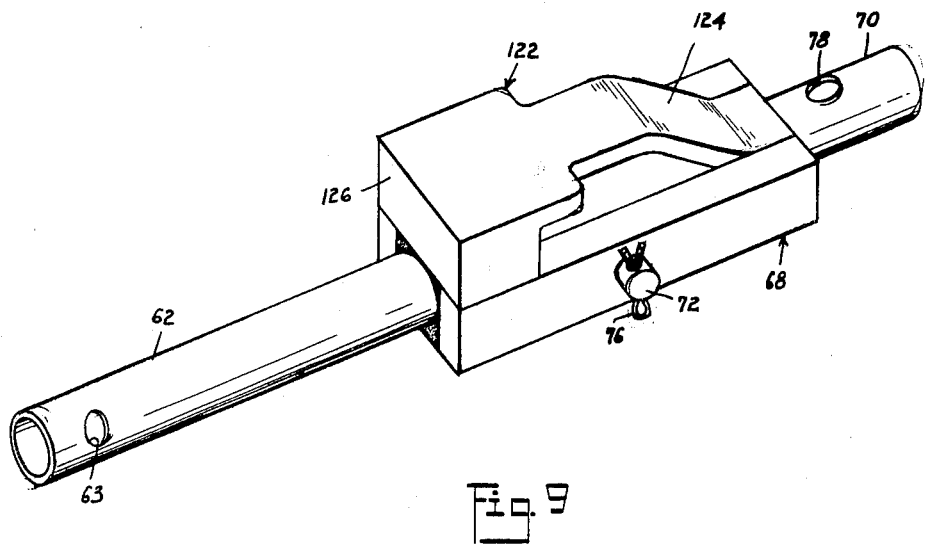
FIG. 9 is a perspective view on reduced scale showing a further modification of the novel hitch assembly of the present invention.

In brief, the novel hitch assembly of the present invention, as defined in several modified forms, may include an elongated support member adapted to be detachably secured at one end to a farm implement or the like. An elongated lever arm may be pivotally supported at one end to the support member and adapted to be detachably connected at its other end to a conventional tractor for propelling the implement in working engagement with the ground. A yieldable means may be arranged for yieldable coaction with the support member and the lever arm, whereby pivotal movement of the support member and lever arm about their pivotal connection may be resiliently maintained to compensate for any relative variations in the angularity between the tractor and a towed implement. The hitch assembly may further be provided with adjustable means mounted and arranged for adjustable coaction with the yieldable means to automatically maintain the towed implement in working engagement with the ground irrespective of irregularities in its contour and to automatically compensate for the implement's striking hidden or undiscovered objects in operation.

In illustrating the preferred form of the present invention, the reference numeral 1 designates the novel hitch assembly embodying the invention, detachably connected at one end to the tongue or toe bar T of a conventional tractor or the like. As shown, the connection with the tongue may be made by means of a stud bolt 2 which fits loosely in registering holes 3 and 4 provided in the hitch assembly and tongue T, respectively. The hitch assembly is provided at its other end with registered openings 5 for the reception of the bolt means whereby a farm implement, such as a disk, plow, cultivator or the like may be detachably connected thereto.

In this form, the novel hitch assembly 1 preferably includes an outer generally L-shaped support member 6 defined by a horizontally extending body portion 8 and a transverse stem or post portion 12 which is preferably square in cross-section and which may be welded or otherwise made integral with the body portion 8. The body portion 8 is also preferably square in cross section, having a generally U-shaped channel 9 extending longitudinally throughout its length and closed across its top, as at 10, adjacent one end to thereby strengthen the body portion in that area. The end portion of the post 12 may be provided with oppositely disposed laterally outwardly extending wing members 14 having recessed retaining portions 16 formed therein for the purpose to be hereinafter more fully described.

For providing a pivotal connection, for example, between a tractor and a towed implement, one end of the support member 6 preferably has registered holes 18 formed therein for loosely receiving a pivot pin 20 for making a pivotal connection by means of cotters 21 to one end of a hollow lever arm 22. As shown, the lever arm 22 may be similarly square in cross section and of a size whereby it may be slidably received within the U- shaped channel 9, provided in the body portion 8 of the support member 6. The other end of the lever arm 22 preferably projects outwardly beyond the U-shaped channel 9 to provide a detachable connection to a tractor or the like, as aforementioned. Obviously, the U-shaped channel 9 and the lever arm 22 are of such cross sectional dimensions, that when registered, they will allow the lever arm 22 to easily pivot about the pivot pin 20 without allowing excessive lateral swinging movement of the lever arm 22 within the channel 9. Such an arrangement when digging furrows, for example, allows the implement to be pivoted in a precise vertical plane for working engagement with the ground and insures that the implement will be propelled along a straight line or longitudinal path to maintain parallelism between adjacent furrows.

For controlling pivotal movement of the lever arm 22, relative to the support member 6, to thereby maintain working engagement of the towed implement, irrespective of variations in the contour of the ground, a vertically disposed inner casing or post member 24 may be provided which is preferably welded or otherwise integrally secured to the upper surface of the lever arm 22. Disposed within the inner post member 24 and loosely supported on the upper surface of the lever arm 22 is a thrust plate 26 having an annular recessed portion 28 formed therein for freely supporting one end of a threaded screw 30. As shown, the screw 30 is preferably threaded throughout its length and projects vertically upward through the open top of the inner casing 24 and is provided at its other end with an adjustable knob 32 fixedly secured thereto for adjustably actuating the screw 30.

As shown in FIG. 4, an outer hollow casing 34 which is apertured at one end and which is similarly square in cross section may be telescopically mounted over the inner post member 24 and adapted for relative vertical sliding movement relative to the inner post member 24. The other end of the outer casing 34 is provided with an opening 36 for the reception of the projecting end of the threaded screw 30 and is further provided with a pair of oppositely disposed and laterally outwardly extending wing members 38 having recessed retaining portions 40 formed therein. In the assembled condition, an adjustable nut 42 may be rotatably mounted on the threaded screw 30 intermediate the top of the inner post member 24 and that of the outer casing 34 for selectively imparting vertical movement to the outer casing 34 upon actuation of the screw 30.

In the telescopically registered position of the inner post and outer casing members 24 and 34, as viewed in FIG. 3, the wing members 38 of the outer casing extend parallel and lie in substantially the same vertical plane with the wing members 14 of the lower post member 12. A pair of coil tension springs 44 and 46 are adapted to be attached at one end over the wing members 38 within the recessed retaining portions 40 and at their other end over the wing members 14 within the recessed retaining portions 16. Moreover, by such a resilient spring arrangement, the outer casing 34 is continuously biased downwardly over the inner post member 24 to thereby control the extent of pivotal movement of the lever arm 22 about its pivotal connection to the support member 6. Accordingly, rotation of the thread screw 30 in a clockwise direction upon the thrust plate 26, as viewed in FIG. 4, causes the adjustment nut 42, threadably mounted thereon, to move upwardly and into abutting engagement against the top of the outer casing 34. Continued rotation of the threaded screw 30 moves the outer casing 34 vertically upwardly against the progressively increasing biasing tension afforded by the respective tension rings 44 and 46. Such biasing force of the coil springs is transmitted through the threaded screw 30 against the freely mounted thrust plate 26 for limiting pivotal movement of the lever arm in a vertical plane about the pivot pin 20. Conversely, counterclockwise rotation of the threaded screw, in the manner prescribed, causes the outer casing 34 to move downwardly to progressively reduce the biasing tension on the coil springs 44 and 46, thereby reducing the thrust force against the thrust plate 26 to allow a greater pivotal movement of the lever arm 22 about the pivot pin 20. By selectively adjusting the biasing tension afforded by the tension springs 44 and 46, a towed implement may be securely attached to the tractor at any predetermined angle and in a manner whereby the implement will be allowed to swing upwardly or downwardly to follow irregularities on the ground, while at the same time insuring that the implement will maintain a constant and uniform working contact with the ground, irrespective of such irregularities in ground contour.

When it is desired to connect an implement to a tractor, the novel hitch assembly 1 may be quickly attached to the tongue T of the tractor by simply dropping the stud bolt 2 through the registered holes 2 and 3 provided in the lever arm 22 and the tongue T, whereupon, the tractor may then be backed toward the implement and the latter pivotally connected to the support member 6 by suitable bolt means (not shown). With the parts thus positioned, the pulling force of the tractor will then be transmitted through the novel hitch assembly to propel the implement along in working engagement with the ground. In the event that the ground is relatively level and free of iregularities, the screw 30 and nut 42 assembly may be adjusted to increase the biasing tension of the coil springs 44 and 46 to limit pivotal movement of the lever arm 22 such that a substantially rigid connection is provided between the tractor and the implement, whereby the latter is maintained with a constant and uniform working or cultivating engagement with the ground. However, when the contour of the ground is irregular, such that the tractor and implement are at varying heights, the screw 30 and nut 42 assembly may be quickly adjusted to compensate for such irregularities by allowing a greater pivotal movement of the lever arm 22 about its pivotal connection to the support member 6. Moreover, when the rear end of a tractor, for example, suddenly elevates in following the contour of the ground, the lever member 22 will be pivoted upwardly while the support member 6 remains in a substantially horizontal plane to retain the towed implement in working engagement with the ground, such as shown in broken lines at FIG. 1. Correspondingly, were the towed implements to suddenly strike an object projecting from or buried in a furrow, the support member 6 would pivot downwardly about its resilient pivotal connection to the lever member 22 to cause the implement to ride up over the obstruction thereby eliminating stress or strain otherwise imparted to the hitch assembly while preventing damage to the implement. Accordingly, such an arrangement provides a relatively resilient pivotal coaction between the vehicle and implement whereby the latter is maintained in positive working engagement with the ground irrespective of unpredictable movements of either resulting from normal operation.

Referring now to FIGS. 5 and 6, which show a modified form of the present invention, the hitch assembly designated generally at 60 includes a tubular member 62 adapted to be connected at one end 63 to an implement (not shown) and which may be secured, such as by welding 64 or the like, at its other end within the channel portion 66 of a generally U-shaped support member 68. A tubular lever arm 70 axially aligned relative to the tubular member 62 may be pivotally disposed at one end within the channel 66 by means of a pivot pin 72 which extends transversely through registered openings 74 provided in the support member 68 and the lever arm 70 and which is secured thereto by suitable cotters 76. The other end of the lever arm 70 may be provided with registered openings 78 for the reception of suitable bolt means or the like for attachment of the hitch assembly to a conventional tractor or the like, as aforementioned.

In this form, to provide a predetermined pivotal movement between the tractor and a towed implement, the hitch assembly 60 may be provided with a vertically disposed inverted U-shaped frame 80 including a top plate 82 and a pair of spaced leg members 84 extending downwardly therefrom which may be welded or otherwise integrally secured to the upper surface of the U-shaped support 68. The top plate 82 may be apertured, as at 86, to receive an elongated bolt 88, the lower end of which slidably extends through registered openings 90 and 92 provided in the lever arm 70 and the support member 68, respectively. A coiled compression spring 94 surrounds the bolt 88 and at its upper end bears against the top plate 82 of the frame 80 and at its lower end bears against the upper surface of the lever arm 70 whereby the free end of the latter may be continuously biased downwardly about its pivotal connection to the support member 68.

In another form as shown in FIGS. 7 and 8, predetermined pivotal movement between the tractor and the towed implement may be accomplished by a modified arrangement, wherein a pre-loaded spring assembly shown generally at 100 may be utilized to achieve preferred results in accord with the principles of the present invention. In this form, the pre-loaded spring assembly 100 preferably includes a cylindrical casing 102 vertically disposed intermediate the spaced arms 84 of the frame 80. The cylindrical casing 102 may be apertured 104 at its upper end to receive the threaded stem 106 of a cylindrical compression plate 108 which is adapted for reciprocal movement within the casing 102. The threaded stem 106 projects upwardly through the associated aperture 36 provided in the top plate 82 and is threadably engaged within a threaded opening 110 provided in a cap plate 112 which in turn may be fixedly secured to the upper surface of the top plate 82. The cylindrical casing 102 is preferably open at its lower end and adapted to receive therethrough a cylindrical bias or pressure applying plate 114 having a generally cylindrical bearing lug 116 projecting downwardly therefrom for bearing engagement against the upper surface of the lever arm 70. A coiled compression spring 118 may be vertically disposed within the cylindrical casing 102 and at its upper end bears against the cylindrical compression plate 106 and at its lower end bears against the upper surface of the cylindrical bias plate 114, such that the bearing lug 116 may be continuously biased against the lever arm 17 to control its pivotal movement relative to the support member 68.

In this form, the threaded stem 106 of the cylindrical compression plate 108 may be provided with a tool engaging surface 120, whereby vertical adjustment of the compression plate 108 may be achieved to maintain a predetermined tension on the coiled compression spring 118. By such an arrangement, the spring-loaded assembly 60 may be pre-set to control the relative pivotal movement between a tractor and a towed implement and in a manner to compensate for any irregularities in the contour of the ground, as aforementioned.

Figure 10:
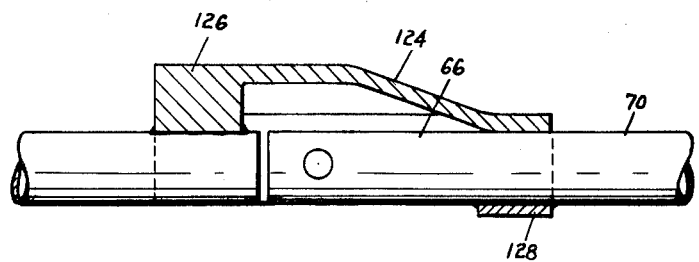
FIG. 10 is a vertical cross sectional view taken along line 10—10 of FIG. 9.

In another modification as shown in FIGS. 9 and 10, the U-shaped support member 68 may be provided with a leaf spring 122 having a resilient curved arm portion 124 of reduced cross sectional dimension and a generally rectangular body portion 126 which may be welded or otherwise integrally secured to the upper surface of the support member 68. In this form, the free end portion of the resilient spring arm extends downwardly into the channel portion 66 of the support member 68 and into biasing engagement against the upper surface of the lever arm 70 whereby a predetermined pivotal movement of the latter may be maintained about its pivotal connection 72 to the support member 68. In this form, the support member 68 may be provided on its under surface at one end with a cross-plate 128 which may be welded or otherwise secured thereto for transversely bridging the channel 66. By such an arrangement, the cross-plate acts as an abutting surface to limit downward pivotal movement of the lever member 70 about its pivotal connection 72 to thereby maintain the towed implement in working engagement with the ground.

Accordingly, in the above modified forms of the novel hitch assembly of the present invention, it will be seen that there is provided a simple, precise, and dependable means whereby a vehicle and any towed implement may be easily and quickly coupled together or uncoupled, as desired. With the novel hitch assembly embodying a resilient yieldable means for coupling together a vehicle and an implement, the hitch may be quickly adjusted for any predetermined pivotal movement either upwardly or downwardly to compensate for any disparity in corresponding movements between the tractor and the implement that may inure as a result of irregularities in the contour of the ground.

As will be seen, several parts of the novel hitch assembly may be variously modified in form, proportion, and arrangement without departing from the scope of the present invention. For example, though for purposes of disclosure the various forms of the support member and the lever arm have been described as generally square or circular in cross-sectional configuration, it is to be understood that various other cross-sectional configurations may also be utilized to achieve preferred results in accord with the principles of the present invention.

Moreover, from the above detailed description of the invention, it is believed that the construction, use, and operation thereof will at once be apparent, while there is herein shown and described the preferred embodiment of the present invention, it is nevertheless to be understood that minor changes may be made therein without departing from the spirit and scope of the invention as claimed.

I claim:

1. A tractor-implement hitch, said hitch comprising,
    a first member having an elongated channel portion opening upwardly therefrom and adapted for securement at one end to an implement, said first member including a downwardly extending post member adjacent its other end thereof,
    a second member pivotally connected at one end within the channel portion of said first member and adapted for securement at its other end to a vehicle,
    telescoping means projecting upwardly from said second member and in vertical alignment with said post member, and
    a pair of coiled springs each of which is attached at one end to said post member and attached at its other end to said telescoping means to provide a resilient pivotal coaction between said first and second members.

2. A tractor-implement hitch according to claim 1 including,
    an adjustable means coacting with said coiled springs for selectively maintaining a predetermined resilient pivotal coaction between said first and second members.

3. A tractor-implement hitch, said hitch comprising,
    a first member adapted for securement at one end to an implement,
    a second member pivotally connected at one end to said first member and at its other end adapted for securement to a vehicle,
    telescoping means mounted on and projecting upwardly from said second member, said telescoping means comprising, an inner casing member and an outer casing member telescopingly disposed for sliding coaction relative to said inner casing member, said inner casing member being attached to said second member, and a pair of coiled springs disposed on opposite sides of said telescoping means, each of said springs being attached at one end to said first member and being attached at its other end to said outer casing member to maintain a resilient pivotal coaction between said first and second members.

4. A tractor-implement hitch according to claim 3, including,
an adjustable means coactingly disposed within said telescoping means to selectively provide a predetermined tension on said springs.

5. A tractor-implement hitch according to claim 4, wherein said adjustable means includes,
a threaded screw disposed within said inner casing member and supported therein for thrust bearing engagement against said second member, and
nut means threadably cooperating with said screw between said inner casing member and said outer casing member to cause vertical movement of said outer casing member relative to said inner casing member to provide simultaneously and uniform tension on said springs upon actuation of said screw.

6. A tractor-implement hitch, said hitch comprising,
a first member having an elongated generally U-shaped channel portion opening upwardly therefrom and adapted for securement at one end to an implement, said first member including a downwardly extending post member adjacent its other end thereof,
a first pair of oppositely disposed arms projecting laterally outwardly from said post member,
a second member pivotally connected at one end within the channel portion of said first member and adapted for securement at its other end to the vehicle, telescoping means mounted on said second member and in parallel alignment with said post member, said telescoping means comprising, an inner casing member and an outer casing member disposed for telescoping sliding coaction relative to said inner casing member, said inner casing member being attached to said second member,
a second pair of oppositely disposed arms projecting laterally outwardly from said outer casing member and in parallel alignment with the arms on said post member,
a pair of coiled springs disposed on opposite sides of said telescoping means, each of said springs being releasably attached at one end to one of the arms on said post member and at its other end to one of the arms on said outer casing member to maintain a resilient pivotal coaction between said first and second members, and
an adjustable means coactingly disposed within said telescoping means to selectively provide a predetermined tension on said springs.

7. A tractor-implement hitch according to claim 6, wherein said adjustable means includes,
a bearing block member loosely supported on said second member within said inner casing member,
a threaded screw disposed within said inner casing member and support for thrust bearing engagement against said block member,
and nut means threadably cooperating with said screw between said inner and outer casing member to cause vertical movement of said outer casing member relative to said inner casing member to provide simultaneous and uniform tension on said springs upon actuation of said screw.

References Cited by the Examiner

UNITED STATES PATENTS

| 2,329,380 | 9/1943 | Arehart | 280—489 |
| 2,463,140 | 3/1949 | Bihn | 280—489 X |
| 2,484,889 | 10/1949 | Hutton et al. | 280—489 X |
| 2,498,780 | 2/1950 | Winchester | 280—405 |
| 2,523,733 | 9/1950 | Stephens | 280—489 |
| 2,797,934 | 7/1957 | Helgeson | 280—489 |

FOREIGN PATENTS

| 22,804 | 3/1920 | France. |
| 810,503 | 12/1936 | France. |

BENJAMIN HERSH, *Primary Examiner.*

LEO FRIAGLIA, A. HARRY LEVY, *Examiners.*